(12) United States Patent
Krauch

(10) Patent No.: US 9,057,459 B2
(45) Date of Patent: Jun. 16, 2015

(54) SPRING BAND CLIP

(71) Applicant: Norma Germany GmbH, Maintal (DE)

(72) Inventor: Karlheinz Krauch, Hammersbach (DE)

(73) Assignee: NORMA Germany GmbH, Maintal (DE)

( * ) Notice: Subject to any disclaimer, the term of this patent is extended or adjusted under 35 U.S.C. 154(b) by 231 days.

(21) Appl. No.: 13/739,629

(22) Filed: Jan. 11, 2013

(65) Prior Publication Data

US 2013/0180086 A1 Jul. 18, 2013

(30) Foreign Application Priority Data

Jan. 14, 2012 (DE) .................. 10 2012 000 717

(51) Int. Cl.
*F16L 33/03* (2006.01)
*F16L 3/12* (2006.01)
*F16L 33/02* (2006.01)
*B25B 27/14* (2006.01)

(52) U.S. Cl.
CPC ............ *F16L 3/1211* (2013.01); *Y10T 24/1484* (2015.01); *F16L 33/021* (2013.01); *F16L 33/03* (2013.01); *B25B 27/14* (2013.01)

(58) Field of Classification Search
CPC ....... F16L 33/021; F16L 33/03; F16L 3/1211; F16L 33/10; B25B 27/14; Y10T 24/1484
USPC ..................................................... 24/20 CW
See application file for complete search history.

(56) References Cited

U.S. PATENT DOCUMENTS

| 4,930,191 A * | 6/1990 | Takahashi et al. ......... 24/20 CW |
| 5,715,579 A | 2/1998 | Beicht et al. |
| 5,855,044 A * | 1/1999 | Cradduck ..................... 24/20 R |
| 5,864,926 A | 2/1999 | Gyöngyösi et al. |
| 6,192,555 B1 * | 2/2001 | Nakamura et al. ......... 24/20 CW |
| 6,343,407 B1 * | 2/2002 | Muto et al. ................. 24/20 CW |
| 6,389,650 B1 * | 5/2002 | Yamada et al. ............ 24/20 CW |
| 2012/0291232 A1* | 11/2012 | Nakamura .................... 24/16 R |

FOREIGN PATENT DOCUMENTS

| DE | 38 32 875 | 8/1989 |
| DE | 196 42 454 | 5/1997 |
| DE | 10 2005 036 208 | 2/2007 |
| DE | 102007017881 A1 * | 10/2008 | .............. F16L 33/03 |

(Continued)

OTHER PUBLICATIONS

German Office Action conducted in counterpart German Appln. No. 10 2012 000 717.5 (May 28, 2014).

(Continued)

*Primary Examiner* — Robert J Sandy
(74) *Attorney, Agent, or Firm* — Greenblum & Bernstein, P.L.C.

(57) ABSTRACT

Spring band clip, removal tool, and method of operating spring band clip. The spring band clip includes an annular curved clip band having a first end portion and a second end portion, which are arranged to form an overlapping region and which are spaced radially from the clip band. A locking device, at least partially integrated in the first end portion, is structured and arranged to lock the clip band in an expanded state.

14 Claims, 2 Drawing Sheets

(56) References Cited

FOREIGN PATENT DOCUMENTS

| EP | 1 045 186 | | | 10/2000 | | |
|---|---|---|---|---|---|---|
| JP | 5-34386 | | | 5/1993 | | |
| JP | 1993-034386 | | | 5/1993 | | |
| JP | 3000520 | | | 8/1994 | | |
| JP | 9-184503 | | | 7/1997 | | |
| JP | 2008-95780 | | | 4/2008 | | |
| KR | 2001-0049255 | | | 5/2001 | | |
| KR | 2006003983 | A | * | 1/2006 | ............. | F16L 33/03 |
| WO | WO 2010092702 | A1 | * | 8/2010 | ............. | F16L 33/03 |
| WO | WO 2011033932 | A1 | * | 3/2011 | ............. | F16L 33/03 |
| WO | WO 2011099136 | A1 | * | 8/2011 | ............. | F16L 33/03 |

OTHER PUBLICATIONS

Korean Office Action conducted in counterpart Korean Appln. No. 10-2013-0003843 (Jan. 15, 2014) (w/ English language translation).
Japan Office Action conducted in counterpart Japan Appln. No. 2012-284864 (Nov. 12, 2013) (w/ English language translation).
German Office Action conducted in counterpart German Appln. No. 10 2012 000 717.5 (Apr. 27, 2012) (with partial translation).
China Office Action conducted in counterpart China Appln. No. 201310010347.X (March 26, 2015) (w/ English language translation).

* cited by examiner

SPRING BAND CLIP

CROSS-REFERENCE TO RELATED APPLICATIONS

The present application claims priority under 35 U.S.C. §119(a) of German Patent Application No. 10 2012 000 717.5 filed Jan. 14, 2012, the disclosure of which is expressly incorporated by reference herein in its entirety.

BACKGROUND OF THE INVENTION

1. Field of the Invention

Embodiments of the invention relate to a spring band clip with a curved annular clip band having a first end portion and a second end portion between which an overlap region is formed, which is radially spaced from the clip band.

Furthermore, embodiments of the invention relate to a tool to release such a spring band clip.

2. Discussion of Background Information

Known spring band clips are used, for example, to attach a hose to pipe fittings. The spring band clip must be expanded to enable it to be pushed onto the hose. The spring band clip then contracts due to its intrinsic pretension, which thus holds it on the hose and presses the hose radially onto the pipe fitting.

Hose clips are known. For example, in German Patent No. DE 10 2005 036 208 B4 a spring band clip is described having markings that serve, after installation, to indicate whether a spring band clip with the correct nominal dimensions has been used.

The required expansion of the spring band clip before the actual installation is often seen as problematic and time-consuming. The expansion of the spring band clip is carried out by pressing the two end portions towards each other, resulting in an increase in diameter of the spring band clip. The use of an additional clip to hold the two end portions at a reduced distance with respect to one another in order to keep the spring band clip in the expanded condition is known. Such a clip is normally removed from the end portions after installation. As a result, there is a risk that the clip may be lost, thus contributing to pollution of the environment. This is especially problematic if the spring band clip is used in connection with moving machinery and in confined spaces. Additional precautions must be taken to prevent loss of the clip.

SUMMARY OF THE EMBODIMENTS

Embodiments of the invention are directed to a spring band clip, which allows for easy installation.

According to embodiments, a spring band clip of the type mentioned includes a locking device, which is at least partially integrated into the first end portion. In this manner, the locking device can be locked in position when the spring band clip is in an expanded state.

Thus, an additional element to keep the spring band clip in the expanded state is not required. Instead, the spring band clip has an integrated locking device, which reduces the effort for the production of the spring band clip. This also means that there are no parts that can be lost during installation. In addition, no additional space needs to be made available to enable the use of the spring band clip in confined spaces. After releasing the locking device, the spring band clip automatically contracts because of its intrinsic pretension to complete the installation.

Preferably, the locking device has a latch bent radially inward from the first end portion and a latching hook, which is arranged on an outer side of the spring band clip. By bending out the latch from the first end portion, a part of the locking device can be produced without additional elements. The latch is first stamped out and then bent accordingly. A latching hook, which is arranged on the outer side of the spring band clip, can then transfer sufficient force to enable the spring band clip to be held securely in the expanded state.

It is particularly preferred that the latching hook is formed integrally with the spring band clip, and is bent radially outwards out of the spring band clip. The latching hook can then be stamped out like the latch and then bent over. The weight of the spring band clip according to the embodiments is not increased when compared to a spring band clip, which does not have the possibility of being held in the expanded state. Rather, the already existing material of the spring band clip is used to form the locking device. In this way, it is not possible to lose one of the elements of the locking device because the latch and the latching hook are formed integrally with the spring band clip. The stamping and bending represents a very inexpensive production step, so that the manufacturing cost of the spring band clip remains very low. The result is a very simple design with low space requirements for the spring band clip.

Preferably, the latch is directed away from the first end portion, such that the latching hook is directed towards the second portion. Such a design enables an automatic locking of the locking device when the spring band clip, for example, is expanded manually. The latch then first slides over the latching hook, which can be deformed radially inwards. Once the latch has been moved beyond the end of the latching hook, the latching hook comes into play so that a return movement of the latch is prevented by the hook. Rather, the orientation of the latching hook causes this to occur by the force exerted by the tendency of the spring band clip to return to a smaller diameter; a force which is transmitted from the latch to the latching hook. Thus, inadvertent release of the locking device is prevented.

It is particularly preferred that the latching hook is designed to be longer than the latch. In this way, the latching hook exhibits a higher elasticity than the latch. Thus, the deformation required for latching is reproduced in essence by the latching hook. This enables the necessary forces to be absorbed very well.

In an alternative embodiment, the latch is designed to be longer than the latching hook. The latch then exhibits a higher elasticity. Accordingly during locking, there is essentially a deformation of the latch. The deformation forces can thereby be absorbed well.

Advantageously, the latch has a contact area for the latching hook extending in the radial direction. Thus, there is a relatively well-defined expanded position of the spring band clip. The position of the contact area will then determine how far the spring band clip is expanded.

Preferably, the first end portion extends in the circumferential direction at least over an angular range in which the latching hook is formed. The latching hook is then protected by the first end portion against external influences. While the first end portion does not necessarily completely cover the latching hook in the axial direction, it can still protect the latching hook from external influences. In this way, it is also achieved that the outer contours of the spring band clip with the locking device do not change compared to a spring band clip without a locking device. This is especially desirable for many applications.

Preferably, the latch extends in the radial direction over approximately half of the distance between the first end portion and the clip band. Thus there is still sufficient space available between the latch and the clip band to guide the latching hook between them. Then the latching hook itself does not necessarily need to be deformed radially outwards.

Preferably, the latching hook can be deformed radially inwards by a release tool, which is inserted between the first end portion and the clip band. By using the release tool, the latching hook can be pressed inwards with respect to the clip band in a relatively simple manner, so that the latching hook can move through beneath the latch. This allows a reduction in the diameter of the spring clip band, thus ensuring a tight fit of the spring band clip. A corresponding release tool can be produced relatively easily and can be used universally for hose clips of any nominal diameters. The expense involved in making available a release tool is therefore relatively low.

Embodiments are directed to a release tool for releasing a locking device of the above-described spring band clip.

Embodiments of the invention are directed to a spring band clip that includes an annular curved clip band having a first end portion and a second end portion, which are arranged to form an overlapping region and which are spaced radially from the clip band. A locking device, at least partially integrated in the first end portion, is structured and arranged to lock the clip band in an expanded state.

According to embodiments, the locking device may include a latch bent radially inwards from the first end portion and a latching hook disposed on an outer side of the clip band. The latching hook can be integrally formed with the clip band and is bent radially outwards from the clip band. Further, the latch can be arranged to face away from the first end portion, while the latching hook is directed towards the second end portion. The latching hook can be longer than the latch. Moreover, the latch can have a contact area extending radially that is arranged to contact the latching hook. The first end portion can extend in a circumferential direction at least over an angular range in which the latching hook is formed. The latch can radially extend more than approximately one-half of the distance between the first end portion and the clip band. Further, the latching hook can be deformable radially inwards by a release tool insertable between the first end portion and the clip band.

Embodiments of the invention are directed to a release tool for releasing a locking device of the above-noted spring band clip.

In accordance with embodiments of the invention, the release tool can be structured for insertion between the first end portion and the clip band to deform the latching hook.

Embodiments are directed to a method of operating a spring band clip that includes an annular band having a first end portion and a second end portion arranged to form an overlapping region. The method includes moving the first end portion and the second end portion toward each other to radially expand the annular band, and engaging a latching hook radially extending from the annular band with a latch radially extending from the first end portion to lock the annular band in a radially expanded state.

According to embodiments, the method can further include inserting a tool between the annular band and the first end portion to move at least one of the latch and the latching hook away from the other, whereby the annular band radially compresses.

In accordance with still yet other embodiments of the present invention, the method can further include moving at least one of the latch and the latching hook away from the other, whereby the annular band radially compresses.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
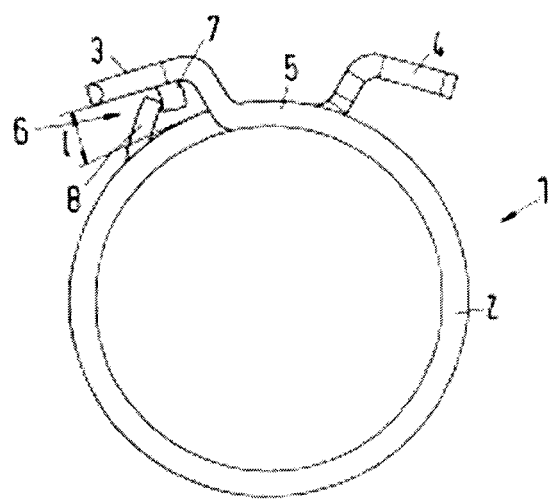
FIG. 1 shows a spring band clip in side view.

FIG. 1 shows a spring band clip 1 having a curved annular clip band 2. The clip band 2 has a first end portion 3 and a second end portion 4, which are formed by the corresponding bent ends of the clip band 2. Thus, the end portions 3, 4 of the clip band 2 are radially spaced with respect to one another.

Between the end portions 3, 4, an overlap region 5 is formed in which two layers of the clip band 2 are arranged axially side by side. The overlap region 5 is increased when the spring band clip 1 assumes its nominal diameter, i.e., not in the expanded state shown in the Figure. Thus, the clip band 2 is provided with a pretension that radially draws together the spring band clip 1.

To keep the spring band clip 1 in an expanded state, which allows for easier installation of the spring band clip 1, the spring band clip 1 is provided with a locking device 6. The locking device 6 is integrated in the spring band clip 1, i.e., it is part of the spring band clip or the clip band 2 and the first end portion 3.

The locking device 6 comprises a latch 7 which is bent radially inwards from the first end portion 3. In addition, the locking device 6 comprises a latching hook 8, which is bent out of the clip band 2. Here, the latch 7 and the latching hook 8 are flexibly deformed so that they assume the positions shown in the figure in the unloaded state.

In order to compensate the axial offset between the first end portion 3 and the locking device 6, the latch 7 and/or the latching hook 8 can be bent in the axial direction as well as in the radial direction. In particular, it is possible for the latch 7 to be embodied or formed as an extension to the first end portion 3 in the axial direction, which is then bent in the radial direction. It is advantageous if the latch 7 has a contact area for the latching hook 8, which extends in radial direction. Thus, there is a defined contact area for the latching hook 8.

The latch 7 extends in the radial direction approximately over half of the distance 1 between the first end portion 3 and the clip band 2. While the contact surface of the latch 7 is large enough to securely engage with the latching hook 8 while, there is still sufficient space beneath the latch 7 to enable the latching hook 8 to pass between the latch 7 and the clip band 2 when the latching hook 8 is elastically deformed radially inwards for the release of the locking device 6.

A release tool may be provided to deform the latching hook 8, and thus to release the locking device 6, by exerting a force in the circumferential direction and/or in the radial direction on the latching hook 8, so that it is deformed radially inwards. This leads to a release of the locking device 6, so that the spring band clip 1 can contract.

Figure 2:
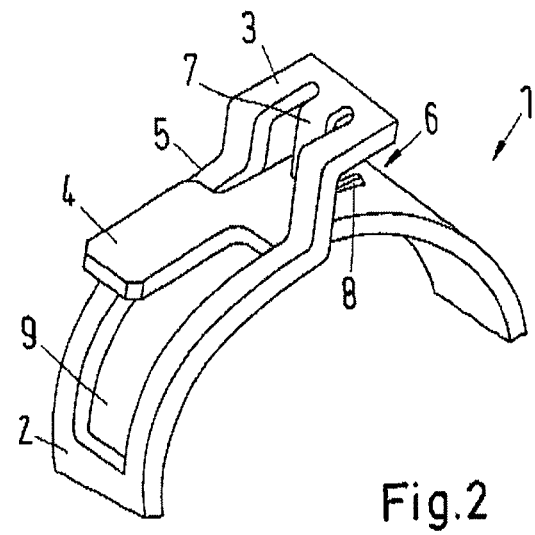
FIG. 2 shows a spatial representation of a spring band clip.

FIG. 2 shows the spring band clip 1 in a spatial representation. In contrast to the embodiment of the spring band clip 1 shown in FIG. 1, in the embodiment according to FIG. 2, the latch 7 is formed to be longer than the latching hook 8, so that the latch 7 is more easily deformable then the latching hook 8.

The spring band clip 1 in the representation in FIG. 2 is shown in the tensioned state, and thus has a relatively large inner diameter. A relative movement between the first end portion 3 and the second end portion 4 (i.e., away from each other) is prevented by the locking device 6 in that the latch 7 is latched behind the latching hook 8. A slot 9 is provided to receive the second end portion 4 in the clip band 2, whereby the end portion 4 is formed with a reduced axial width so that it can be received in the slot 9. The overlap region 5 is thus formed about the slot 9.

The latch 7 is integral with the first end portion 3 and is bent radially inwards in such a way that it engages with the latching hook 8.

Figure 3:
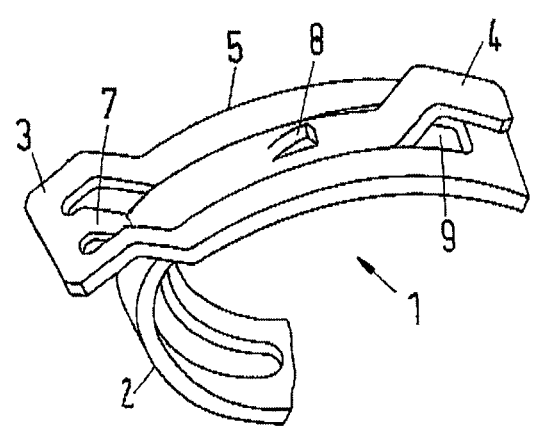
FIG. 3 shows the spring band clip according to FIG. 2 in the released state.

In FIG. 3, the spring band clip 1 according to FIG. 2 is shown in the released state so that, after releasing the locking device 6, for example, the latch 7 has been deformed by the action of a release tool, such that the latch 7 has been moved over the latching hook 8, so that the end sections 3, 4 are moved away from one another in the circumferential direction. Due to the pretension of the clip band 2, the spring band clip 1 has contracted and now has a reduced diameter compared to the state shown in FIG. 2. Accordingly, the overlap region 5 has increased.

By the reception of the second end portion 4 in the slot 9 of the clip band 2, both the latch 7 and the latching hook 8 are axially centered in the clip band 2. This results in a very symmetrical force transmission. At the same time, simple production is possible.

The entire spring band clip 1, including the clip band 2, the end portions 3, 4 and the locking device 6 are made as a single element, for example, a steel band. The locking device 6 is formed by simple stamping and bending of the latch 7 and the latching hook 8.

Thus, this results in a spring band clip 1, which enables holding in the expanded state, while the manufacturing cost is simultaneously kept low. This spring band clip 1 has a simple structure and a low mass and requires only a small space. It therefore does not require additional components, which ensures easy handling.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A spring band clip comprising:
    an annular curved clip band having a first end portion and a second end portion, which are arranged to form an overlapping region and which are spaced radially from a circumferential band;
    a locking device, at least partially integrated in the first end portion, being structured and arranged to lock the clip band in an expanded state,
    wherein the locking device comprises a latch bent radially inwards from the first end portion and a latching hook disposed on an outer side of the circumferential band.

2. The spring band clip according to claim 1, wherein the latching hook is integrally formed with the clip band and is bent radially outwards from the circumferential band.

3. The spring band clip according to claim 1, wherein the latch is arranged to face away from the first end portion, while the latching hook is directed towards the second end portion.

4. The spring band clip according to claim 1, wherein the latching hook is longer than the latch.

5. The spring band clip according to claim 1, wherein the latch has a contact area extending radially that is arranged to contact the latching hook.

6. The spring band clip according to claim 1, wherein the first end portion extends in a circumferential direction at least over an angular range in which the latching hook is formed.

7. The spring band clip according to claim 1, wherein the latch radially extends more than approximately one-half of the distance between the first end portion and the circumferential band.

8. The spring band clip according to claim 1, wherein the latching hook is deformable radially inwards to release the latch.

9. The spring band clip according to claim 1, wherein the latching hook is circumferentially spaced from the second end portion.

10. A method of operating a spring band clip that includes an annular band having a first end portion and a second end portion arranged to form an overlapping region and a circumferential band between the first and second end portions, the method comprising:
    moving the first end portion and the second end portion toward each other to radially expand the annular band; and
    engaging a latching hook radially extending from an outer surface of the circumferential band with a latch radially extending from the first end portion to lock the annular band in a radially expanded state.

11. The method according to claim 10, further comprising moving at least one of the latch and the latching hook away from the other to radially compress the annular band and release the annular band from the locked radially expanded state.

12. The method according to claim 10, further comprising releasing the annular band from the locked radially expanded state by moving at least one of the latch and the latching hook away from the other.

13. The method according to claim 10, wherein the latching hook is circumferentially spaced from the second end portion.

14. A spring band clip comprising:
    an annular curved clip band having a circumferential portion extending between a first end portion and a second end portion that are arranged to form an overlapping region and that are arranged to extend radially outward from the circumferential portion;

a locking device comprising a latch bent radially inwards from the first end portion and a latching hook extending radially outward from the circumferential portion,
wherein the latch and latching hook are arranged so that the latch and latching hook engage one another at a circumferential distance from the second end portion in order to hold the spring band clip in an expanded state.

\* \* \* \* \*